Sept. 22, 1964  AKIO TANAKA  3,150,012
PORTABLE STORAGE BATTERY WITH WATER RESERVOIR
Filed Nov. 22, 1961
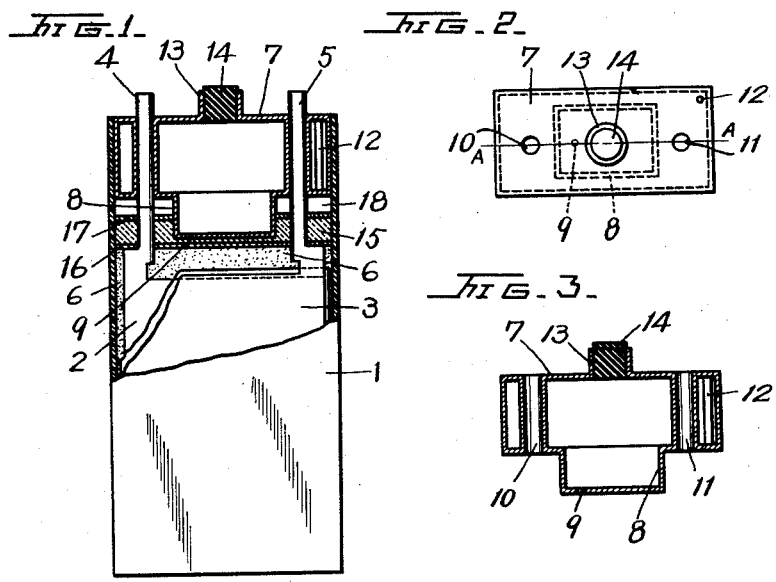

United States Patent Office 3,150,012
Patented Sept. 22, 1964

3,150,012
PORTABLE STORAGE BATTERY WITH
WATER RESERVOIR
Akio Tanaka, 304 4-chome, Shinjuku-machi,
Katsushika-ku, Tokyo, Japan
Filed Nov. 22, 1961, Ser. No. 154,152
9 Claims. (Cl. 136—162)

The present invention relates to improvements in and relating to a storage battery which employs a colloidal electrolyte and more particularly to a portable storage battery of the type in which a water reservoir is provided and said water reservoir is adapted to automatically replenish the electrolyte with water when the water content in the electrolyte has decreased due to repeated charge and discharge cycles in the storage battery, whereby to maintain the water content in said electrolyte at an opportune state.

The term "storage battery employing colloidal electrolyte" used here refers to the type of storage battery in which the electrolyte is in a paste or gel form, and accordingly, the electrolyte substantially functions like a solid substance, or the type of storage battery in which a plurality of fibrous sheets are disposed in the liquid electrolyte so as to cause the sheets to absorb the electrolyte whereby the electrolyte is prevented to freely move by the absorbing action of said fibrous sheets to the extent that the same assumes as if it was solidified. These types are generally called "electrolyte-retaining batteries."

Generally, in case a storage battery is repeatedly charged, the water in the electrolyte in said battery tends to gradually decrease because of the water being electrolyzed and the electrolyte has to be very frequently replenished with distilled water during the service life of the battery.

In a storage battery employing a colloidal electrolyte, since such an electrolyte is not of fluidity, even if the storage battery is caused to shake or turn over, the electrolyte will not leak out of the container and such a battery is quite advantageous as portable storage battery, but if one fails to replenish the battery with water, cracks develop in the gelatinous composition of the colloidal electrolyte resulting in poor contact between the plates and the electrolyte, which will increase the internal resistance and greatly decrease the electric capacity of the battery. If such a phenomenon develops beyond a tolerable limit, even if the battery is replenished with water from an outside source, the battery can not regain its original state. Therefore, with respect to this type of battery, in order to maintain the electrolyte at a constant hydrous state, a great deal of care is required for the maintenance of such a battery.

In the prior art method for the above purpose, a thin water layer was provided on the surface of the electrolyte or an oil layer was provided on the electrolyte surface. However, both of these methods require the provision of a specific device on the vent opening as seen in the ordinary types of storage batteries for the prevention of electrolyte leakage, which abandons one of the advantages which the storage battery employing a colloidal electrolyte possesses, that is, the feature which the said type of battery does not require any specific device for the leakage prevention of the electrolyte.

In another attempt for the electrolyte leakage prevention in which a water retaining layer formed of an acid resistance fiber such as a glass fiber mat is disposed on the surface of the electrolyte and said layer is caused to absorb water and maintain the collodial electrolyte surface at a suitable moisture state whereby to prevent the electrolyte from leaking, but in this method, when the electrolyte is replenished with water, frequently an excessive amount of water is supplied, and accordingly, it is very often seen that the surplus water has to be discharged. After such an operation has been repeated, the electrolyte becomes diluted resulting in a greately deteriorated character as well as reduced capacity for the battery.

According to the present invention, in a storage battery container a water retaining layer formed of an acid resistant fiber such as a glass fiber mat is disposed over the electrolyte and a water reservoir having a small hole is airtightly disposed on the top of said water retaining layer, said small hole being adapted to cause capillary action in cooperation with said water retaining layer. By virtue of the provision of the above water retaining layer and water reservoir, when the water content in the electrolyte has decreased, the water within the reservoir is automatically absorbed by the water retaining layer so that the electrolyte may be always maintained at an opportune hydrous state.

According to the present invention, when the water content in the colloidal electrolyte has decreased due to repeated charge and discharge cycles in the storage battery during its service life or after the storage battery has been left unused for a considerably long time, the water replenishment operation can be continuously and automatically performed by means of the water reservoir, and accordingly, it is not necessary to replenish distilled water from an outside source which is necessary in the prior art storage batteries employing the colloidal electrolyte. Furthermore, according to the present invention, when the water content in the colloidal electrolyte has diminished, capillary action takes place between the water retaining layer and the small hole in the water reservoir whereby a required amount of water is absorbed by the water retaining layer from the reservoir. Since the above water replenishment operation can be automatically performed in proportion to a decrease in amount of the electrolyte water until the water kept within the water reservoir has been depleted, the electrolyte can be at all times maintained at an opportune hydrous state.

Furthermore, in a storage battery according to the present invention, the water reservoir is airtightly disposed in the interior of the container so as to serve as a sealing means for the battery and the electrolyte is covered by the water retaining layer formed of an acid resistance fiber disposed above, the acid fume generated while the storage battery being put to use is absorbed by this water retaining layer thereby so that the fume may be prevented from leaking out of the battery.

Therefore, in the storage battery according to the present invention, the water reservoir does not need to be replenished with distilled water from any outside source until the water therein is depleted, and the maintenance of the storage battery is quite simple and the same can be said as a suitable portable storage battery. In addition, since the electrolyte can be all times maintained at a constant hydrous state, any decline in efficiency of the battery due to the scarcity of the water content can be prevented thereby to ensure a longer service life for the battery as compared with the prior art storage batteries which also employ the colloidal electrolyte.

These and other more detailed and specific advantages will be made clear in the course of the following detailed explanation in conjunction with the accompanying drawings, in which:

FIG. 1 shows an embodiment constructed in accordance with the present invention in which the water reservoir whose upper portion is provided with an inlet is airtightly disposed in the interior of the container and the plate poles vertically extend through said reservoir, and which also shows a portion thereof in section.

FIG. 2 is a top plan view of the water reservoir as shown in FIG. 1.

FIG. 3 is a vertical section view taken along the line A—A in FIG. 2.

FIG. 4 shows a second embodiment constructed in accordance with the present invention in which the plate poles are disposed on one side of the water reservoir instead of the same extending through said reservoir and the water reservoir having an inlet on one side of its lower portion in airtightly disposed in the interior of the container, and which also shows a portion thereof in cross section.

FIG. 5 is a top plan view of the water reservoir as shown in FIG. 4.

FIG. 6 is a vertical section view taken along the line B—B in FIG. 5.

Referring now to FIGS. 1 through 3 inclusive wherein the first embodiment according to the present invention is shown. As seen in FIG. 1, a positive plate 2 and a negative plate 3 are immersed in a colloidal electrolyte 6 with a separator disposed (not shown) between them, said electrolyte 6 comprising dilute sulfuric acid containing soda silicate blended therewith, and a water reservoir 7 containing distilled water wherein is disposed within a container 1. The pole 4 of the positive plate 2 and the pole 5 of the negative plate 3 vertically extend through said water reservoir 7. A water retaining layer 15 is disposed over the surface of said reservoir 7, said water retaining layer 15 comprising an acid resistant fiber such as a glass fiber mat and being adapted to replenish said colloidal electrolyte 6 with water to maintain the latter at an opportune hydrous state. A lower porous plate 16 and an upper porous plate 17 are respectively disposed on the bottom surface and the upper surface of said water retaining layer 16 respectively.

As shown in FIGS. 2 and 3, the water reservoir 7 has a small hole 9 in its bottom extension 8, bores 10 and 11 through which the plate poles 4 and 5 extend are respectively provided apart from both sides of said extension 8 and an exhaust pass 12 is provided at one corner of the extension 8. A pouring bore 13 in which a plug 14 is fit is disposed on the top of said water reservoir 7, and said plug 14 being formed of an elastic material such as soft rubber or synthetic resin. The water reservoir 7 is airtightly disposed in the interior of the upper portion of the container 1 with its bottom extension 8 extending into the water retaining layer 15 thereby to define an opening 18 around the extension 8. By the term "airtightly," as used herein, it is meant that the water reservoir is substantially sealed with the exception of the small hole 9 through which, under the proper conditions, water flows. Under ordinary operating conditions, because of the air tight structure for the reservoir, water would not flow from the reservoir to the water retaining layer except by capillary action.

The storage battery constructed as above is replenished with water in the following procedure. The battery is first turned upside down and an injection needle is pierced through the elastic material made plug 14 to inject distilled water within the water reservoir 7. Since the air within the water reservoir 7 is exhausted through the small hole 9, opening 18 and exhaust pass 12 out of the container 1, the distilled water can be easily supplied into the water reservoir 7. Upon pulling the injection needle out of the plug 14, the needle hole formed in the plug 14 is caused to instantly close up because the plug 14 is formed of an elastic material, and the water reservoir 7 returns to its original closed state. When this storage battery has returned to its normal standing state, if the glass fiber mat which forms the water retaining layer 15 is in a dried condition, air enters through the small hole 9 into the water reservoir 7 and simultaneously the glass fiber forming the water retaining layer 15 absorbs water to an operative hydrous state by the capillary action. When the glass fiber of the water retaining layer 15 has absorbed a predetermined amount of water, the small hole 9 closes itself to prevent air from entering into the water reservoir 7 and simultaneously there will be no more capillary action caused by the small hole 9 thereby to shut off the flow of water.

In a modified embodiment as shown in FIG. 4 through FIG. 6 inclusive, the pole plates 4 and 5 are both disposed extending on one side of the container 1 instead of them extending through the water reservoir 7, and the water reservoir 7 is disposed on the other side of the container 1. And in this embodiment, the lower portion 19 of the water reservoir 7 is fit within the upper interior of the container 1.

In this modified embodiment, as shown in FIGS. 5 and 6, the water reservoir 7 is provided with a small hole 9 on its bottom and a pouring hole 13 is provided on one side thereof, in which an elastic material made plug 14 is fit. An exhaust pass 12 is provided adjacent to the side wall of the water reservoir 7 opposed to the side where said pouring hole 13 is disposed. A cover member 20 is provided adjacent to the water reservoir 7 and said cover member 20 is provided with two bores 10 and 11 through which the plate poles 4 and 5 extend, respectively.

The lower portion of the water reservoir 7 where the small hole 9 is provided extends into the water retaining layer 15 disposed on a porous plate 16 which is in contact with the colloidal electrolyte 6 and a porous plate 16 is disposed on the water retaining layer 15. Said porous plate 17 and cover member 20 define an opening 18 therebetween. Said opening 18 is communicated through the exhaust pass 12 into the atmosphere. In FIG. 4, numeral 21 designates the filler charged in the recess of said cover member 20. Said filler 21 is comprised of an acid resistance substance such as a compound synthetic resin. Said filler 21 is adapted to seal the openings around the holes on the cover plate 20 where the pole plates 4 and 5 extend through.

The storage battery as shown in FIGS. 4 through 6 inclusive is replenished with water in the following procedure:

The storage battery is first turned sidewise so that the pouring hole 13 of the water reservoir 7 may be upwardly disposed and then the plug 14 within the hole 13 is taken out. Upon the removal of said plug 14, distilled water is poured through the opened hole 13 into the water reservoir 7. In this case, a substantial amount of the air within the water reservoir 7 is discharged through the small hole 9, opening 18 and exhaust pass 12 into the atmosphere. The small hole 9 is disposed on the bottom of the reservoir 7 at the side where the pouring hole 13 is disposed, and accordingly, the water will not flow down into the container 1 until the water reservoir 7 has been filled up with the water.

After the completion of the water replenishment operation, the storage battery is returned to its normal standing state, and as in the case of the embodiment as illustrated in FIGS. 1 through 3 inclusive, if the glass fiber mat of the water retaining layer 15 is in a dried condition, the air flows through the small hole 9 into the water reservoir 7 and simultaneously capillary action takes place whereby the water retaining layer 15 absorbs the electrolyte water until its glass fiber has been saturated with the water. When the glass fiber has absorbed a sufficient amount of water, the small hole 9 automatically closes itself thereby to block the flow of the air into the water reservoir 7 and at the same time the capillary action caused by the small hole 9 disappears and the water flow from the water reservoir is blocked.

From the above explanations with respect to the two embodiments utilizing the principle of the present invention, it will be understood that the water replenishment operation can be automatically performed in charge and discharge cycles whilst the storage battery is in active service or after the battery has been left unused for a long time. That is, when the water content in the colloidal electrolyte has decreased, the water absorbed and retained by the acid resistant fiber water retaining layer 15 is absorbed by the electrolyte thereby to render said layer 15 to a dry state. There upon, the capillarity takes place between the water retaining layer 15 and small hole 9 of the water reservoir 7, and accordingly, the water within the water reservoir 7 flows down through said small hole 9 to restore the water retaining layer 15 to an opportune hydrous state. Therefore, the water retaining layer 15 automatically and continuously absorbs the water from the water reservoir 7 in accordance with any decrease in the water content within the colloidal electrolyte 6 whereby said electrolyte can be maintained at an opportune hydrous state until the water reservoir 7 has been depleted.

Furthermore, the present invention is also applicable to the so-called electrolyte-retaining battery in which a plurality of acid resistant fiber separators, such as glass fiber, are disposed in the liquid electrolyte so as to cause the separators to absorb the electrolyte whereby the electrolyte is prevented to freely move by the absorbing action of said fibrous separators.

As seen from the above explanation, according to the present invention, since any change of water content in the electrolyte, which may take place during charge and discharge cycles in a storage battery in service or while the battery is in storage, can be automatically controlled so as to maintain the electrolyte at an opportune hydrous state and the maintenance and handling of the storage battery is quite easy. And in the storage battery according to the present invention, since the container is sealed by the water reservoir which also serves as a sealing member for the container and the capacity for said reservoir can be suitably selected, frequent water supply into the water reservoir can be eliminated whereby a quite practical portable storage battery can be provided.

What I claim is:

1. An automatic water replenishing portable storage battery having a pair of plates immersed in a colloidal electrolyte within a container, said battery comprising an acid resistant fiber water retaining layer which is disposed over said colloidal electrolyte, a water reservoir, said reservoir being airtight and disposed in the upper interior portion of said container, the bottom of said reservoir having a small hole therein in contact with said water retaining layer, and said water reservoir further having an exhaust pass which communicates into an opening formed over said water retaining layers, said battery being so constructed that when the water content in said water retaining layer has decreased, water passes by capillary action from said water reservoir down through said small hole into said water retaining layer, and when said water retaining layer has been saturated with the water from said reservoir, the water flow into the water retaining layer is caused to be automatically closed.

2. A portable storage battery according to claim 1 in which said acid resistant fiber mat water retaining layer is inserted between an upper porous plate and a lower porous plate, said lower porous plate being in contact with said colloidal electrolyte and said upper porous plate being disposed in the opening which communicates into said exhaust pass.

3. A portable storage battery according to claim 1 in which said colloidal electrolyte comprises dilute sulfuric acid with sodium silicate.

4. A portable storage battery according to claim 1 in which the liquid electrolyte is absorbed by a plurality of acid resistant fiber separators and is substantially solidified to the extent that the electrolyte is absorbed by the fiber of said separators.

5. A portable storage battery according to claim 1 in which said water reservoir has an elastic plug on its top and two vertically extending bores at the points adjacent both sides, said plates having connected thereto poles extending through said vertically extending bores.

6. A portable storage battery according to claim 2 in which said glass fiber mat water retaining layer is inserted between said upper and lower porous plates and is disposed over said colloidal electrolyte in the container, the center portion of said water retaining layer being in contact with the protruding bottom portion of said water reservoir so as to define an annular opening around said bottom protrusion, in cooperation with the porous plate disposed on the water retaining layer, and said annular opening communicating into said exhaust pass.

7. A portable storage battery according to claim 1 in which said water reservoir has a side pouring bore in which an elastic plug is inserted and a cover member which is separated from the water containing compartment of said reservoir and has two vertically extending bores through which a pair of pole plates extend in an airtight arrangement, the lower portion of said water reservoir being tightly fitted in the upper interior portion of said container, and said water reservoir further having a small hole at its bottom extension in contact with said water retaining layer, and an exhaust pass being disposed in the cover member, said exhaust pass communicating into the opening disposed over said water retaining layer.

8. A portable storage battery according to claim 2 in which said fiber mat water retaining layer is disposed between the upper and lower porous plates over the colloidal electrolyte in the container, said water reservoir being disposed on one side within said container with its bottom in contact with said water retaining layer, the upper and lower porous plates and the cover member connected to said water reservoir defining a rectangular opening between them, and said exhaust pass communicating into said opening.

9. In an automatic water replenishing portable storage battery having, a container in which a pair of plates are immersed in a colloidal electrolyte, the improvement which comprises, in combination, an acid resistant fiber water retaining layer disposed above said colloidal electrolyte and a chamber having a portion thereof disposed adjacent said water retaining layer and adapted to be a water reservoir, said chamber having a small hole therein communicating with and in contact with said water retaining layer, and otherwise being airtightly sealed, whereby water in said reservoir is caused to flow to said water retaining layer by capillary action when the water content in said water retaining layer has decreased and water flow to said retaining layer is effectively prevented when said water retaining layer is substantially saturated with water.

References Cited in the file of this patent

UNITED STATES PATENTS

| 1,695,667 | Schuster | Dec. 18, 1928 |
| 2,176,173 | Fuller et al. | Oct. 17, 1939 |
| 2,573,802 | Mitchell | Nov. 6, 1951 |
| 2,615,607 | Huskey | Oct. 28, 1952 |